Patented July 24, 1928.

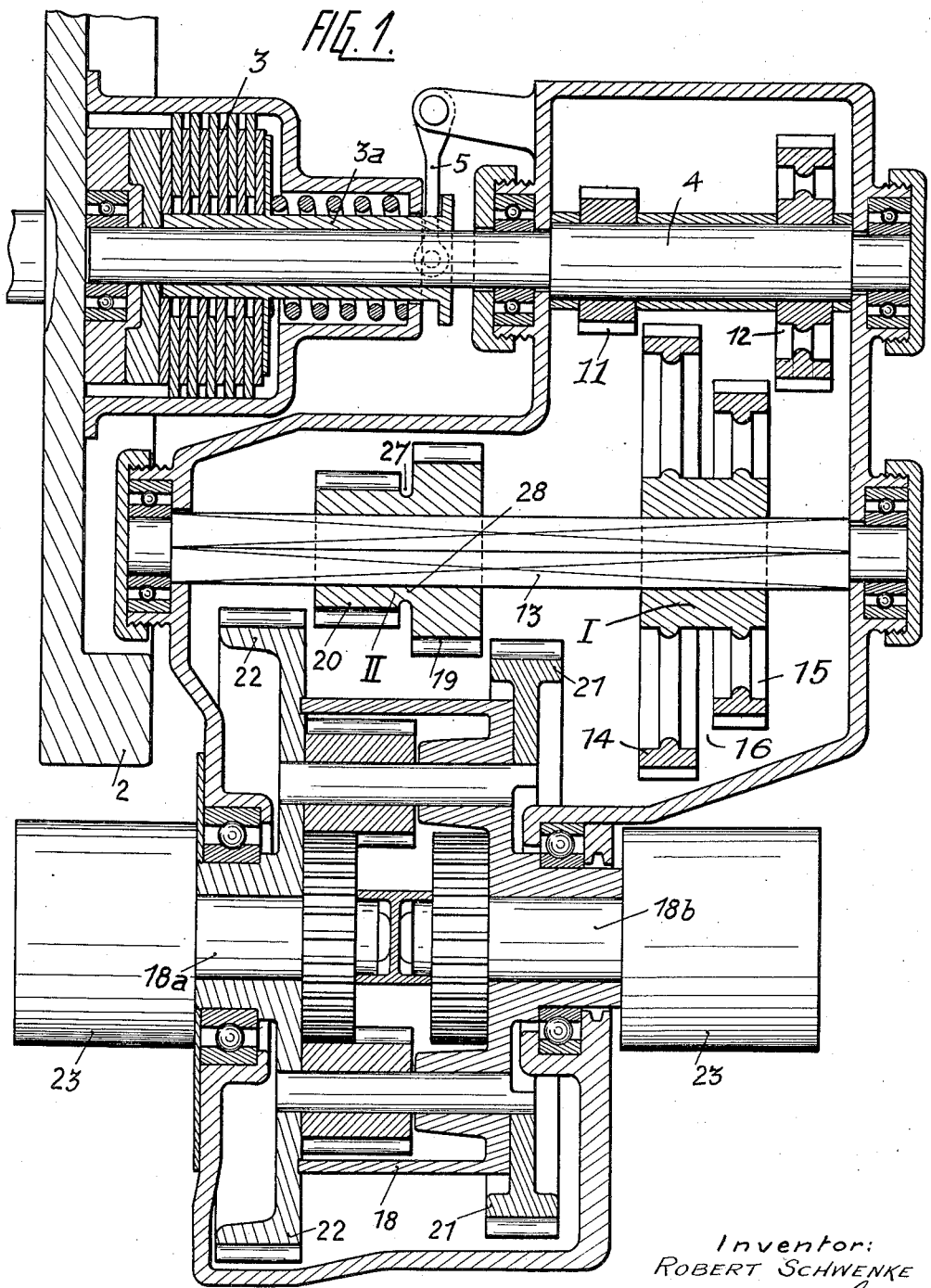

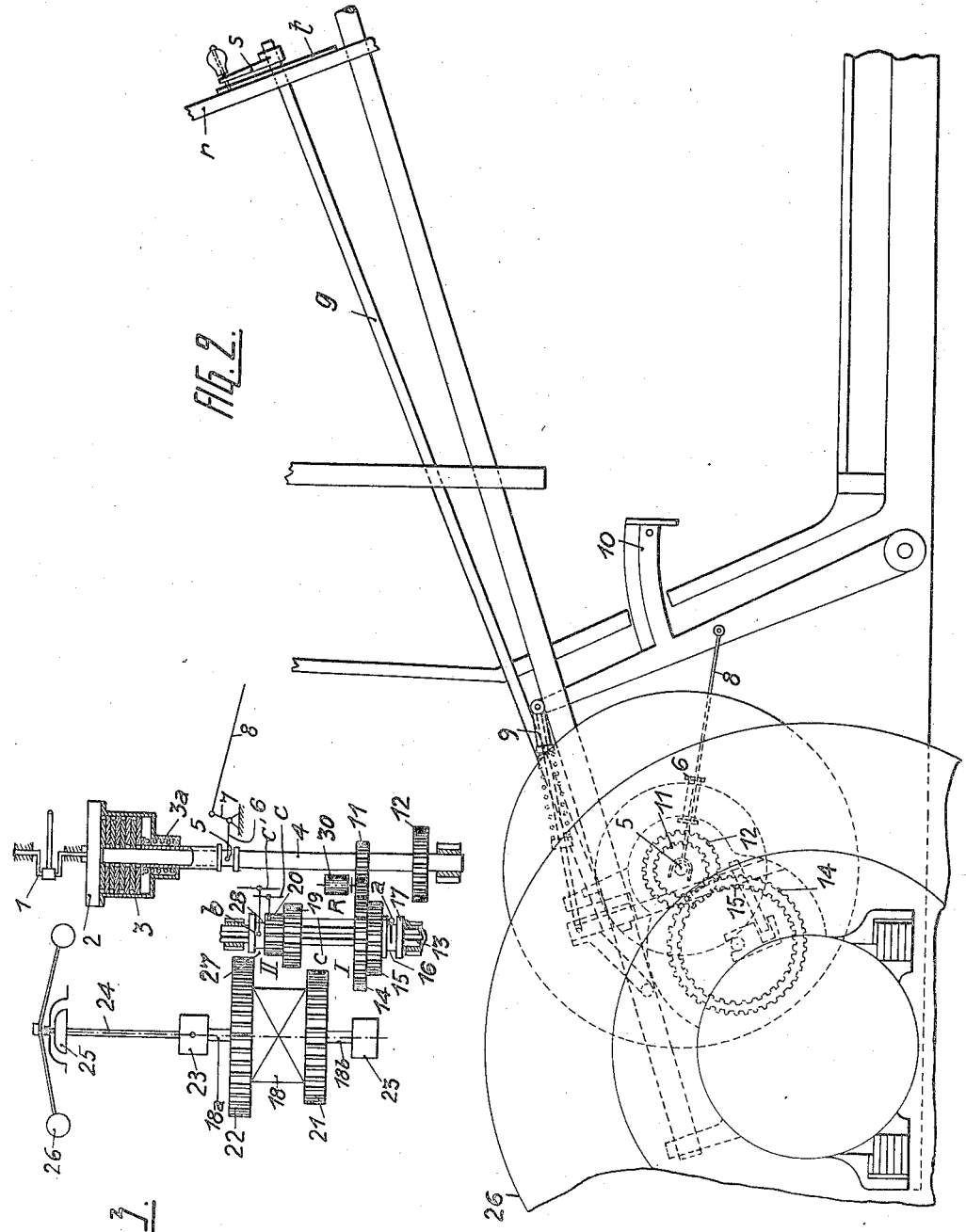

1,678,447

UNITED STATES PATENT OFFICE.

ROBERT SCHWENKE, OF BERLIN-CHARLOTTENBURG, GERMANY.

DRIVING DEVICE FOR THE FRONT WHEELS OF MOTOR CARS.

Application filed April 27, 1927, Serial No. 187,107, and in Germany January 23, 1925.

The invention relates to a driving device for the front wheels of motor cars the motor shaft and the Cardan shafts of which are arranged at right angles to the course direction, the Cardan shafts being driven by the differential gear. I arrange at the one side of the longitudinal vertical median plane of the vehicle a clutch with multiple laminated discs and the first of two series connected change speed gears, at the other side the second of the said change speed gears and symmetrically to the median plane the differential gear, the purpose of this arrangement being to let free at the righthand and lefthand side from the differential sufficient space for positioning the two Cardan shafts transmitting the motion from the differential gear to the front wheels.

I provide either change speed gear with a sliding double change speed pinion, the double pinions being operated in any suitable manner to mesh with the change speed gears or be placed in neutral position.

It will be understood that when I refer to the particular function for which the particular species herein disclosed is designed I do so rather by way of explanation than by way of limitation, and that my invention is of the genus expressed in the description and claim as well as of the species referred to in explanation of the particular construction.

In the accompanying drawings

Figure 1 is a diagrammatical plan view showing the arrangement of the two change speed gears;

Figure 2 is a diagrammatical elevation of the front part of the vehicle, seen from the lefthand side;

Figure 3 is a diagrammatical plan view of the complete driving device.

The fly wheel 2 being secured upon the motor crank shaft 1 carries a clutch 3 with multiple laminated discs and is arranged at the righthand side of the longitudinal vertical median plane of the vehicle. In the continuation of the motor crank shaft 1 the motor or clutch shaft 4 is arranged. The part 3ª of the clutch 3 is slidably but not rotatably arranged upon the shaft 4 and is controlled by a fork 5 connected to a bell crank lever 7 fulcrumed at the fixed point 6. The lever 7 is connected to the clutch pedal 10 by means of a link member 8.

Secured upon the lefthand portion of the shaft 4 are two driving wheels 11 and 12 the diameters of which are unequal. The arrangement of the wheels 11 and 12 oppositely to the clutch device 3, 3ª provides for space for the clutch device.

Parallel to the shaft 4 there is rotatably arranged an intermediate shaft 13 the transversal section of which is not circular. Slidably but not rotatably mounted upon the shaft 13 is a block I carrying two pinions 14 and 15 to be alternatively engaged with the driving wheels 11 and 12. Upon a hub 17 projecting from the block I, a circular groove 16 is provided to receive a controlling fork a. A second block II carrying two toothed wheels 19 and 20 is slidable but not rotatable upon that portion of the shaft 13 which is crossed by the median longitudinal vertical plane of the vehicle. The differential gear 18 is arranged symmetrically to this plane and carries two pinions 21, 22 to be engaged alternatively by one of the wheels 19, 20. From both of the parts 18ª, 18ᵇ of the differential shaft the motion is, by means of a Cardan joint 23 at either side, transmitted to an intermediate shaft 24 and from this to a Cardan joint 25 which is connected in a complicated but well known manner to the front wheel 26 serving simultaneously for driving, steering and braking purposes. The second block II is also provided with a projecting hub 28, a circular groove 27 of the same to be engaged by a fork b.

The fork a is secured to a member c and the fork b to a member c', said members being operated in any suitable way to shift the forks a and b and controlled from the dashboard in front of the driver.

The operation of the specified device is as follows:

An automobile is used either in the inner streets of a city or otherwise in regions with much traffic, or in a free carriage road, or in the outskirts of a town that is to say: in the first case the driver is constrained often to stop and to start again and in the second case he may preserve during a long time the same gear position and after each stopping he has abundant time for starting again. But both in the city and in the country the driver should have the possibility, to change at each moment between two velocities, according to the quality of the street, and especially of its upward slope. The velocities do not differ substantially for the city and country traffic notwithstanding the greater velocities permitted for roads to be viewed for great distances. The requirement of a great starting moment that is to say, to come in a little time from stopping firstly to a small velocity, and then, again in a little time, to a great velocity, is very important for the city traffic. This is attained in both cases by the motor being driven with a great number of revolutions, that is to say, with a great output during the starting time. This output is much greater, after the desired velocity is attained, than will be necessary for preserving the same. In order that the motor, in keeping up its revolution number, will give not more than the necessary output, the fuel delivering is throttled, that is to say during the course with constant velocity the motor has a bad efficiency.

In the country traffic the case is reverse. There the motor runs without throttling of the fuel delivering or with a little throttling that is to say with a high efficiency and with little fuel costs, the velocity being constant. But for the vehicle, a longer time is necessary to move from standing position to the first velocity and from this to the second.

These relationships make it necessary to attach, for the city traffic, the intermediate shaft 13 with the motor shaft 4 by means of a large gear ratio that is to say in such a manner that the motor crank shaft 1 runs, for a given revolution number of the intermediate shaft 13, with a very great velocity. For the country traffic the intermediate shaft 13 is connected with the motor shaft 4 by means of a small gear ratio. The great gear ratio is attained by coupling the wheels 11 and 14, as clearly shown in Figure 3 and the little gear ratio is attained by coupling the wheels 12 and 15. The said large or small gear ratios between the motor and the intermediate shafts 4 and 13 can be then retained for a long time, that is to say, the gear ratio is changed only in the case of travelling from the city to the country or vice versa.

The specified normal setting for city or country travel is effected by setting the change wheel block I either with its large toothed wheel 14 in the small toothed wheel 11 keyed upon the motor shaft 4 or with its small wheel 15 in the large wheel 12 keyed upon the motor shaft 4. This alternative meshing of the gears of different ratios to drive shaft 13 at different speeds is effected by any suitable shifting arrangement controlled from the driver's seat. As soon as the wheel 14 or 15 is engaged with the wheel 11 or 12 respectively the further moving of the sliding block I is prevented by a stop not shown.

It will be understood that a reversing gear may be associated with the gears 11, 12, 14 and 15 in any desired way and controlled by any well-known means.

What I claim is:

A driving gear for the front wheels of motor cars, comprising a motor crank-shaft arranged transversely to the direction of travel of the car, a clutch arranged at one side of the longitudinal vertical median car plane, a clutch shaft, a plurality of gears secured to said clutch shaft, an intermediate shaft arranged parallelly to the motor crank-shaft, a first set of change speed gears shiftably arranged on the intermediate shaft at the side opposite to the clutch to be interconnected with the gears secured on the clutch shaft, a differential, a set of gears secured thereon, and a second set of change speed gears shiftably arranged on the intermediate shaft at the clutch side to be interconnected with the gears secured on the differential.

In testimony whereof I have signed this specification.

ROBERT SCHWENKE.